US010642690B1

(12) United States Patent
Tian et al.

(10) Patent No.: US 10,642,690 B1
(45) Date of Patent: May 5, 2020

(54) POLICY-DRIVEN RAID REBUILD

(71) Applicant: Tintri by DDN, Inc., Santa Clara, CA (US)

(72) Inventors: Lei Tian, Sunnyvale, CA (US); Shobhit Dayal, San Francisco, CA (US); Amit Gud, San Jose, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 153 days.

(21) Appl. No.: 15/848,330

(22) Filed: Dec. 20, 2017

Related U.S. Application Data

(60) Provisional application No. 62/436,994, filed on Dec. 20, 2016.

(51) Int. Cl.
*G06F 11/00* (2006.01)
*G06F 11/10* (2006.01)
*G06F 3/06* (2006.01)

(52) U.S. Cl.
CPC .......... *G06F 11/1092* (2013.01); *G06F 3/061* (2013.01); *G06F 3/0619* (2013.01); *G06F 3/0689* (2013.01); *G06F 11/1096* (2013.01)

(58) Field of Classification Search
CPC ...... G06F 3/061; G06F 3/0619; G06F 3/0689; G06F 11/1092; G06F 11/1096
See application file for complete search history.

(56) References Cited

U.S. PATENT DOCUMENTS

| 10,402,261 | B2* | 9/2019 | Sherlock | |
|---|---|---|---|---|
| 2006/0218433 | A1* | 9/2006 | Williams | G06F 11/1092 714/6.32 |
| 2012/0079317 | A1* | 3/2012 | Nelogal | G06F 11/1092 714/6.22 |
| 2014/0281689 | A1* | 9/2014 | Fischer | G06F 11/1092 714/6.22 |
| 2017/0322845 | A1* | 11/2017 | Nomura | G06F 3/0613 |

OTHER PUBLICATIONS

Holland et al., Fast, On-Line Failure Recovery in Redundant Disk Arrays, Proceedings of the 23rd Annual International Symposium on Fault-Tolerant Computing, 1993.
Lee et al., Automatic Recovery from Disk Failure in Continuous-Media Servers, IEEE Transactions on Parallel and Distributed Systems, May 2002, pp. 499-515, vol. 13, No. 5.
(Continued)

*Primary Examiner* — Joshua P Lottich
(74) *Attorney, Agent, or Firm* — Van Pelt, Yi & James LLP (57) ABSTRACT

A system for policy-driven RAID rebuild includes an interface to a group of devices each having stripe units. At least one of the devices is a spare device available to be used in the event of a failure of a device in the group of devices. The system further includes a processor coupled to the interface and configured to determine, based at least in part on an ordering criteria, an order in which to reconstruct stripe units to rebuild a failed device in the group of devices. The processor is further configured to rebuild the failed device including by reconstructing stripe units in the determined order using the spare device to overwrite stripe units as needed.

22 Claims, 4 Drawing Sheets

(56) References Cited

OTHER PUBLICATIONS

Tian et al., PRO: A Popularity-based Multi-threaded Reconstruction Optimization for RAID-Structured Storage Systems, FAST '07: 5th USENIX Conference on File and Storage Technologies, 2007, pp. 277-290.
Wan et al., Victim Disk First: An Asymmetric Cache to Boost the Performance of Disk Arrays Under Faulty Conditions, USENIX Annual Technical Conference, 2011.
Wu et al., JOR: A Journal-guided Reconstruction Optimization for RAID Structured Storage Systems, 2009 15th International Conference on Parallel and Distributed Systems, 2009, pp. 609-616.
Wu et al., Workout: I/O Workload Outsourcing for Boosting RAID Reconstruction Performance, FAST '09: 7th USENIX Conference on File and Storage Technologies, 2009, pp. 239-252.
Xie et al., Collaboration-Oriented Data Recovery for Mobile Disk Arrays, 2009 29th IEEE International Conference on Distributed Computing Systems, 2009, pp. 631-638.

* cited by examiner

| STRIPE UNIT | REBUILD TIME SCORE | USER PERFORMANCE SCORE | DATA AVAILABILITY SCORE |
|---|---|---|---|
| D21 | 0.50 | 0.05 | 0.95 |
| D22 | 0.60 | 0.10 | 0.80 |
| P2 | 0.95 | 0.55 | 0.95 |
| D23 | 0.85 | 0.50 | 0.05 |
| ... | ... | ... | ... |

FIG. 6

|  | DEVICE 1 | DEVICE 2 | DEVICE 3 | DEVICE 4 | SPARE |
|---|---|---|---|---|---|
| STRIPE 1 | D11 | D21 | D31 | P4 | P2 |
| STRIPE 2 | D12 | D22 | P3 | D41 | D23 |
| STRIPE 3 | D13 | P2 | D32 | D42 | D22 |
| STRIPE 4 | P1 | D23 | D33 | D43 | D21 |

FIG. 7

POLICY-DRIVEN RAID REBUILD

CROSS REFERENCE TO OTHER APPLICATIONS

This application claims priority to U.S. Provisional Patent Application No. 62/436,994 entitled POLICY-DRIVEN RAID REBUILD filed Dec. 20, 2016 which is incorporated herein by reference for all purposes.

BACKGROUND OF THE INVENTION

RAID (redundant array of independent disks) is a data virtualization storage technology that facilitates error handling and data recovery in storage systems. In a process called RAID rebuild, when there is a device failure, RAID regenerates data contents on the failed device from the surviving devices, and then restores the data onto a spare device. However, during RAID rebuild, system performance suffers because user I/O response time increases due to, possibly among other factors, interferences from internal rebuild I/Os. The duration and extent of the performance degradation depends on various factors such as the length of rebuild time and I/O traffic associated with the rebuild. Moreover, as underlying storage systems become denser and incorporate new devices such as SSDs, users experience increased performance degradation because RAID rebuild takes longer and the risk of additional drive failures occurring during the rebuild and associated unrecoverable data loss increases.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As storage systems evolve and performance expectations increase, RAID rebuild for storage systems becomes more challenging. In one aspect, storage systems are becoming denser and incorporating a variety of devices such as hard disk drives (HDDs) and solid state drives (SSDs). SSDs have become especially popular because of its ability to handle random read/write performance, low energy consumption, shock resistance, and small form factor. The density and diversity of storage systems tends to increase the time it takes to rebuild a device in the storage system (called "rebuild time"). RAID rebuild regenerates data contents on a failed device of a storage system. In one aspect, during RAID rebuild, additional device failures may occur. Thus, when RAID rebuild time increases, the risk of additional drive failures occurring during rebuild increases. When additional drive failures occur during rebuild, data may become irretrievably lost. In another aspect, increased RAID rebuild time causes longer response times of user applications. Some user applications have performance expectations such as service-level objectives (SLO), and performance degradation during RAID rebuild could cause a storage system to violate the SLOs or other performance objectives of end users specified in service level agreements (SLA). Conventional RAID rebuild sometimes have long rebuild times because they are unable to efficiently handle dense/diverse storage system. The long rebuild time causes performance latency because handling read/write requests when data is unavailable due to rebuild impairs performance.

Policy-driven RAID rebuild is disclosed. In various embodiments, policy-driven RAID rebuild improves the functioning of computing systems using a RAID-based storage system by rebuilding in a manner determined at least in part by one or more applicable policies. Examples of such policies include, without limitation, policies to balance and prioritize rebuild based on criteria and/or metrics specified and/or otherwise embodied in the policy, such as performance, availability, and reliability criteria and metrics. In some embodiments, the policy-driven RAID rebuild scheme balances these factors dynamically and adaptively, even where these factors might be conflicting. Unlike a conventional RAID rebuild process, which sequentially rebuilds from the first stripe unit to the last stripe unit on the failed disk, in various embodiments, RAID rebuild progresses according to one or more policies that prioritize stripe units to be rebuilt, which is not necessarily in a sequential order.

During rebuild, remaining stripe units (those that have not yet been reconstructed) can be evaluated (e.g., periodically), which may update an order in which the remaining stripe units are to be reconstructed.

The policy driven RAID rebuild techniques described here have several advantages over conventional RAID rebuild methods. In one aspect, policy is separated from mechanism. Stripe units can be reconstructed in any order, and need not be reconstructed sequentially. A stripe unit rebuild sequence can be dictated by, among other things, specific policies configurable by user. The policies may balance rebuild time, user performance, and/or data availability. In another aspect, the flexible RAID rebuild framework described in various embodiments here integrates a prioritizing (e.g., scoring) scheme to determine stripe unit rebuild priority. Different policies can be combined in a weighted manner as more fully explained below.

In various embodiments, a system for policy-driven RAID rebuild includes an interface to a group of devices each having stripe units. An example of a group of devices is more fully described below with respect to FIG. 1. The group of devices includes at least spare device available to be used in the event of a failure of a device in the group of devices. The system also includes a process configured to determine based on, among other things, an ordering criteria, an order in which to reconstruct stripe units to rebuild a failed device in the group of devices. An example of how the ordering criteria is determined is more fully described below with respect to FIG. 4. The processor is further configured to rebuild the failed drive including by reconstructing stripe units in the determined order using the spare device to overwrite stripe units as needed.

Figure 1:
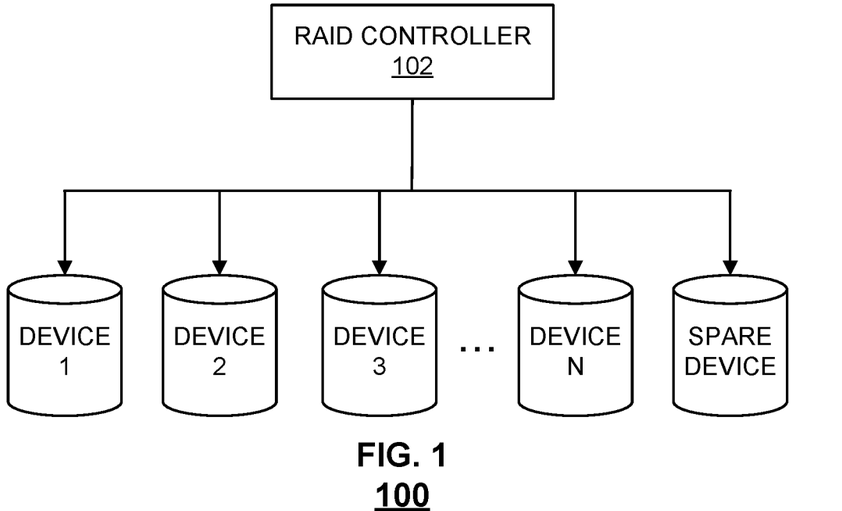
FIG. 1 is a block diagram of a redundant storage system that can be rebuilt by a policy-driven RAID rebuild according to embodiments of the present disclosure.

FIG. 1 is a block diagram of a redundant storage system that can be rebuilt by a policy-driven RAID rebuild according to embodiments of the present disclosure. In the example shown in FIG. 1, devices 1 through N and one or more spare devices (represented here by "spare device") form a group of redundant storage devices that store data and/or parity information. Devices 1 through N may be serving in an active role, which means that they are each configured to (i) service read and write requests and/or (ii) store user data and/or parity data. At least some of the devices that are serving in active roles in the RAID group are configured to store at least some data that is redundantly stored on one or more other devices of the group based on a protocol of data distribution of a RAID scheme that is associated with the RAID group. A storage device that is in an active role is sometimes referred to herein as an "active storage device."

The spare device may be serving in a spare role, which means that it does not service read and write requests but is available/on standby for storing reconstructed data that is lost on a failed active storage device. A storage device that is in a spare role is sometimes referred to herein as a "spare storage device." In various embodiments, each of devices 1 through N and the spare device may be implemented by a storage drive such as a solid state drive (SSD), hard disk drive (HDD), or the like.

RAID controller 102 is configured to receive requests from an application (not shown) and to send the requested data back to the application. RAID controller 102 (sometimes called "RAID layer") is configured to receive an input set of data, process the input data according to a protocol of data distribution (e.g., generate parity information based on the input data) that is applied to the RAID group, and store the output data across the active storage devices according to the protocol of data distribution that is applied to the RAID group.

In some embodiments, a filesystem interfaces between an application and a RAID system. In some embodiments, RAID controller 102 and the functionalities therein are separate from a filesystem. In some embodiments, RAID controller 102 and the functionalities therein are included in a filesystem. For example, system administrators may deploy filesystems to provide file-level services. Filesystems take read/write requests from applications such as word processing tools, databases, etc., and forward the requests to the underlying RAID group. Example file systems include Linux® Ext3/Ext4, Windows® NTFS, and FreeB SW/Unix UFS, and variants of Log-structured File System (LFS) such as Linux® NILFS/F2FS. One of the features of LFS is optimization for random writes. LFS converts random writes into sequential writes, and does not overwrite data in place. LFS maintains an open segment buffer, and the data to write is placed in the segment buffer until the buffer is full and a physical segment is chosen and written with the data contents in the segment buffer.

Figure 2:
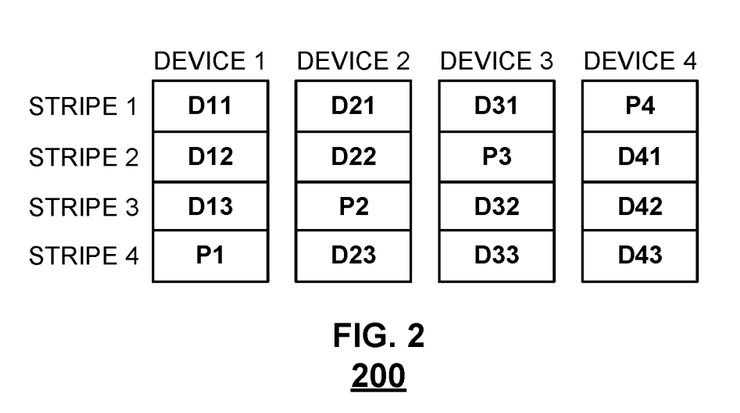
FIG. 2 is a diagram showing stripes and stripe units in an example RAID group.

FIG. 2 is a diagram showing stripes and stripe units in an example RAID group. For example, devices 1 through N and the spare device of FIG. 1 have stripes and stripe units like those shown in the example of FIG. 2. In the context of a RAID group, the storage space on each device is divided into a series of contiguous blocks ("stripe units") with the same size.

Typically, data stored in a RAID group is "striped" across the drives such that logically sequential data is segmented in a way that accesses of sequential segments can be made to different drives. A "stripe" refers to a group of stripe units, where each unit belongs to one device in the group. In other words, a "stripe unit" is a sub part of a device and so a "stripe" is a group of stripe units. For example, a RAID group can comprise 10 devices each of size 100 GB. A stripe unit can be a 2 MB continuous region of a device. A stripe is the group of 2 MB stripe units on each drive taken together to form a 20 MB region (in some cases such as RAID 4 or RAID 5, the region formed is 18 MB excluding one 2 MB stripe unit).

A stripe unit is the basic unit for data distribution, and can be used to store data or parity. A stripe is the basic unit for fault tolerance. Each stripe may have use one or more stripe units to store parity information, which allows RAID to recover the data of data stripe units on the failed devices. Referring to FIG. 2, the stripe units in Device 1 are D11, D12, D13, and P1. Here, three stripe units are used for data (D11, D12, and D13), and one stripe unit is used for parity (P1). Stripe units D11, D21, D31, and P4 form Stripe 1 as shown.

Figure 7:
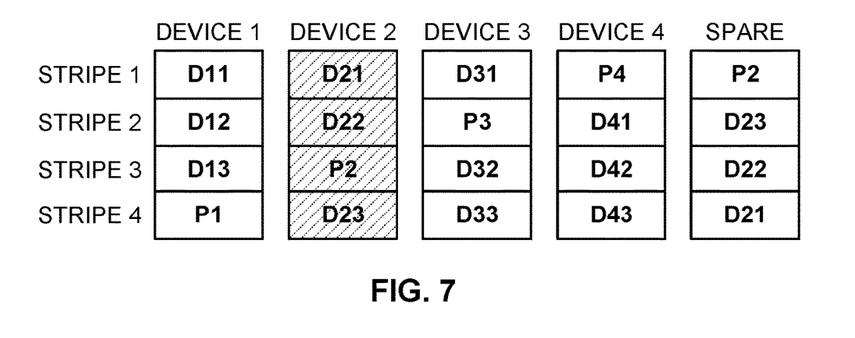
FIG. 7 is a diagram an example RAID group including a drive rebuilt using policy-driven RAID rebuild.

A RAID group provides fault tolerance because of the redundancy of data stored among the devices of the group. In the event that a device in the group fails (e.g., when a disk controller informs the RAID controller that an operation to read data at the disk has failed) or it is otherwise appropriate to reconstruct the data associated with that device, the data stored on the failed device is reconstructed using data/parity on the remaining, available devices of the group. For example, at least some of the set of additional data units of the spare device that comprises an extra set of parity information can be used to reconstruct the data of the failed device. An example of device failure is shown in FIG. 7.

In a typical RAID group, parity data written on an available drive may be used, along with data read from other available devices, to reconstruct data that was stored on a failed device or that has become corrupted. When exclusive or (XOR) parity is used, for example, the parity data may be used to perform XOR computations using the parity data and related data in a set of data values that has been striped across devices in the RAID group to reconstruct data that cannot be read because a device on which it was stored has failed.

Furthermore, in various embodiments, the reconstructed data associated with the failed device of the group can be written to the spare device. Subsequent to the reconstruction operation, requests that are received at RAID controller 102 that are associated with the failed device can be redirected to the spare device, which stores the reconstructed data of the failed device.

Typically, a failed device is rebuilt by reconstructing stripe units sequentially, in order of increasing stripe number to rebuild the device. Suppose Device 2 fails. Device 2 may be rebuilt by sequentially writing data D21, data D22, parity P2, and data D23 to a spare storage device. However, sequential reconstruction of stripe units can be inefficient. For example, some stripe units are rarely accessed yet rebuilt earlier simply because they are earlier in the sequence of stripes. Unlike conventional RAID rebuilding in which stripe units are processed sequentially, in various embodiments, stripe units are prioritized for rebuilding according to a policy, as will be described in further detail below.

Figure 3:
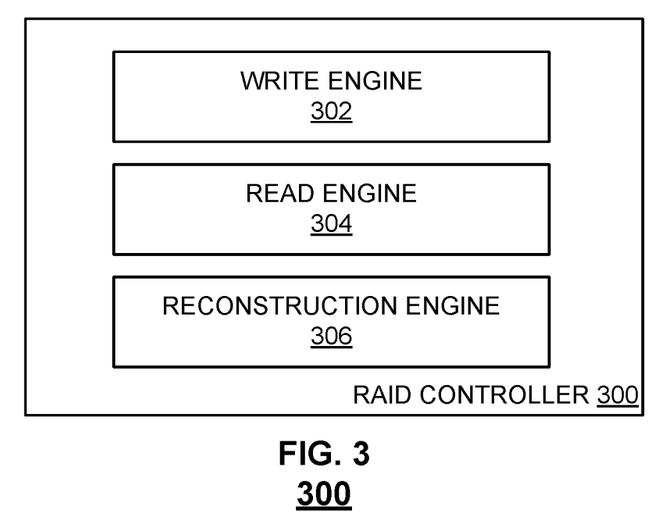
FIG. 3 is a block diagram illustrating an embodiment of a RAID controller.

FIG. 3 is a block diagram illustrating an embodiment of a RAID controller. In some embodiments, RAID controller 102 of FIG. 1 can be implemented using RAID controller 300 to manage a group of redundant storage devices that comprise a RAID group such as the group of devices shown in FIG. 1. RAID controller 300 includes write engine 302, read engine 304, and reconstruction engine 306. Write engine 302 and read engine 304 are configured to receive requests (e.g., read requests or write requests sent by an application), service the requests, and send the results (e.g., requested data) back to the requesting application.

Write engine 302 is configured to receive write requests from applications via a filesystem such as LFS. Write engine 302 is configured to receive input data and store the input data across the devices of the group of redundant devices as stripes. A write request that is received by write engine 302 may be a request to write data to a full stripe of the RAID group of devices or a request to write data to one or more individual devices (stripe units) at a stripe of the RAID group of devices. In some embodiments, if a write request for a full stripe write does not include enough data for a full stripe, the data included in the write request is collected until there are enough user data blocks to at least partially fill the user data stripe units of a stripe. The parity stripe units are then computed, and the entire stripe is written to the devices in the RAID group.

If a protocol associated with data distribution of the group of redundant storage systems (e.g., a particular RAID-based scheme) requires that one or more sets of parity information are stored across the group of redundant devices, then write engine 302 is configured to generate these sets of parity information based on the input data and store the generated sets of parity information across the group of devices. For example, write engine 302 computes parity data using a portion of user data included in the write request, and generates parity data based on the RAID scheme that is employed. Parity data may be generated based on a predetermined error correction code (e.g., Reed-Solomon).

Write engine 302 issues the write request to those devices of the RAID group to which the write request is directed (e.g., either all devices or a subset of devices). Write engine 302 may receive indications of write success or failures from each device to which a write request was issued.

Read engine 304 is configured to process read requests from applications via a filesystem such as LFS. In various embodiments, a read request includes an offset within a specified unit of a specified device within the RAID group. In response to receiving a read request, read engine 304 reads the requested data from the device and then returns the read data to the requestor. In some embodiments, if current data is not readily available, read engine 304 is configured to instruct reconstruction engine 306 to reconstruct the current data associated with a stripe unit based at least in part on querying the other devices of the RAID group.

In various embodiments, RAID controller 300 includes read cache and/or write cache (not shown). The read and/or write cache can exploit data locality to improve read/write performance. For example, write cache allows RAID to report the completion of a file system write before the data is written to a device (e.g., disk medium). Read cache helps absorb and service user read requests at RAM speed without immediate direct involvement of disks.

Reconstruction engine 306 is configured to generate reconstructed data associated with a device of the group of devices. In some embodiments, data stored on a device is reconstructed from the other devices in the group in the event that the device fails. In some embodiments, if additional data units include an extra set of parity information that is not stored in any of the devices of the group, reconstruction engine 306 is configured to use at least some of the additional data units that are stored in the spare storage device, in addition to data values stored on at least one other device in the group, to reconstruct the data associated with the failed device. The reconstructed data is then stored in the spare device. After the reconstruction operation is complete, the spare device is now included in the group of devices and stores only the reconstructed data associated with the failed device and will service requests that would have otherwise been serviced by the failed device.

The following figures illustrate a policy-driven RAID rebuild that takes various performance objectives into consideration and adjusts a RAID rebuild process dynamically and adaptively in response to changes to application workloads and custom requirement preferences.

Figure 4:
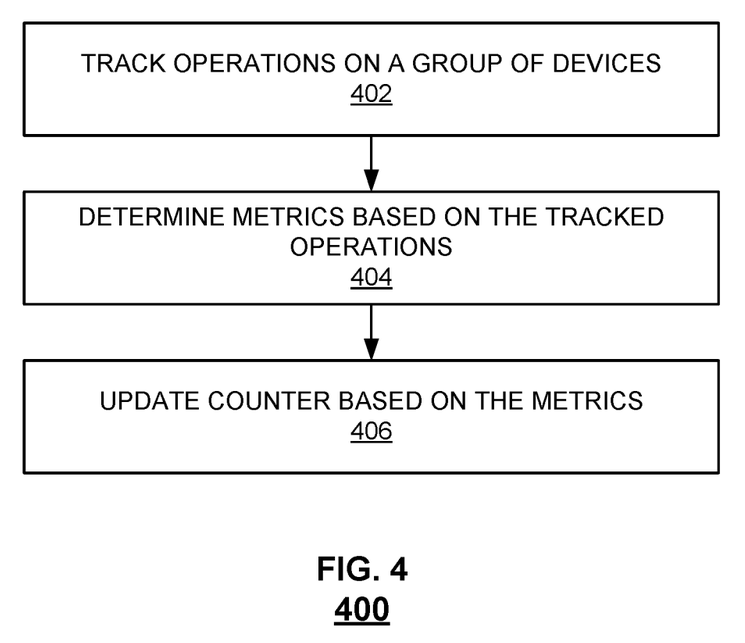
FIG. 4 is a flow chart illustrating an embodiment of a process to track operations on a RAID group.

FIG. 4 is a flow chart illustrating an embodiment of a process to track operations on a RAID group. Process 400 may be implemented by RAID controller 102 based on operations on underlying storage devices such as Devices 1 to N and the spare device shown in FIG. 1. Process 400 may be performed by reconstruction engine 306 shown in FIG. 3 based on observations of write engine 302 operations and read engine 304 operations.

Process 400 begins by tracking operations on a group of devices (402). In various embodiments, the group of devices comprises a group of redundant storage devices such as a RAID group. Operations may include read operations in which data is to be retrieved from the group of devices. Operations may include write operations in which data is received and to be stored in a group of devices. The received data may include user data to be stored across various stripes of the group of devices. The received data may be associated with a write request or read request, examples of which are described with respect to FIG. 3. Operations can be tracked on a per stripe unit basis.

Metrics are determined based on the tracked operations (404). In various embodiments, the metrics allow the system to recognize when stripe units become more or less important. For example, how often or recently an operation is performed may indicate that an associated stripe unit is more important. Consequently, the stripe unit may be prioritized to be rebuilt earlier than a less important stripe unit. The metrics may change over time. Tracking and determining metrics allows an order in which stripe units are rebuilt to be adapted dynamically. In some embodiments, during a rebuild process, an order of rebuilt can change based on the determined metrics.

In various embodiments, the filesystem has awareness of a relationship between a file and an application. For example, a filesystem is aware of which file belongs to which VM, what type of application a file belongs to (e.g., database, word processing, etc.), and the like. The filesystem may indicate this relationship to an underlying RAID controller, allowing the controller to determine an order in which to rebuild stripe units corresponding to the file at rebuild time.

Counters are updated based on the metrics (406). Counters to track operations and capture the determined metrics can be implemented by a variety of data structures. A time stamp or time decayed value may indicate how recently an operation was performed. A stripe unit write counter can be maintained to keep track of the number of writes per stripe unit. A stripe unit read counter can be maintained to keep track of the number of reads per stripe unit. A heat map (e.g., bitmap) can be maintained to keep track of frequency of operations on the storage system. The heat map indicates areas of the storage system that receive frequent operations. These areas are called "hot portions" of the storage system. The information stored in the counters may be used to determine an order according to an ordering criteria, as more fully described herein with respect to FIG. 5.

Figure 5:
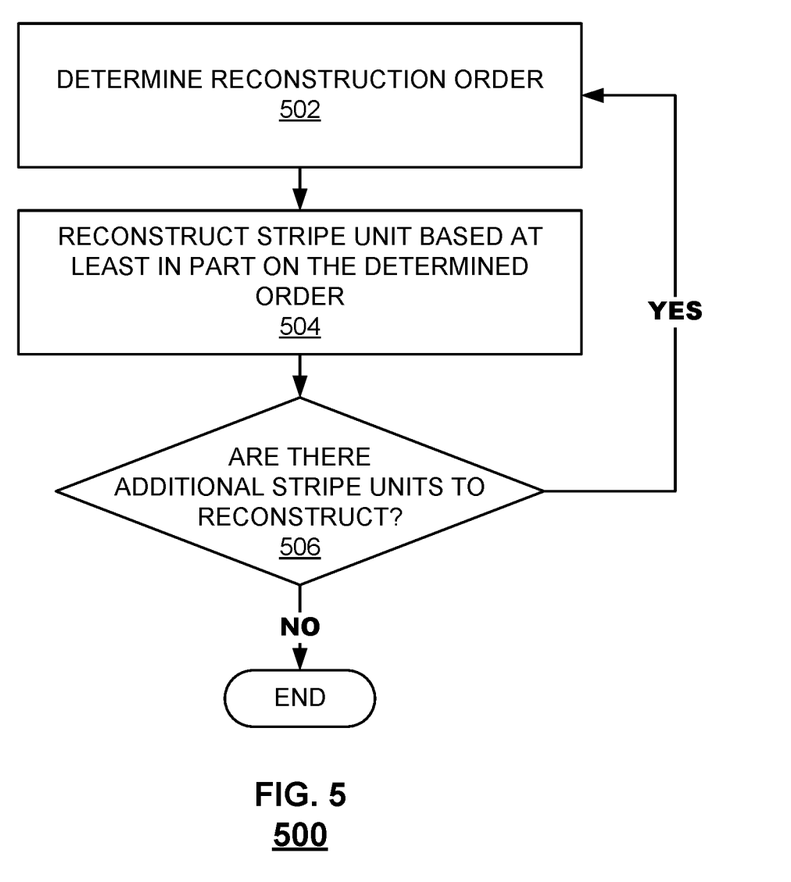
FIG. 5 is a flow chart illustrating an embodiment of a process for policy-driven RAID rebuild.

FIG. 5 is a flow chart illustrating an embodiment of a process for policy-driven RAID rebuild. Process 500 may be implemented by RAID controller 102 on underlying storage devices such as Devices 1 to N and the spare device shown in FIG. 1.

Process 500 begins by determining a reconstruction order (502). The reconstruction order is an order in which to reconstruct stripe units to rebuild a failed device in a group of devices. For example, the reconstruction order is an order in which the remaining stripe units are to be reconstructed.

In various embodiments, order determination includes removing stripe units that do not need to be rebuilt. For example, stripe units that have already been rebuilt and/or do not need to be updated are removed from a list of stripe units to be rebuilt. Empty stripe units, e.g., those that do not contain data, may also be removed.

The reconstruction order may be determined based on, among other things, an ordering criteria. That is, the policy by which to execute RAID rebuild is based on the ordering criteria. The ordering criteria defines a hierarchy by which to reconstruct data. In some embodiments, the hierarchy is determined without needing to calculate scores. The hierarchy may be determined based on workload dynamics of the storage devices. For example, the ordering criteria may include how frequently an area of a storage system is accessed. For example, a "hot portion" of the storage system is an area that is frequently accessed for read/write or other operations. In various embodiments, the area is a logical area corresponding to logical addresses accessed by user applications. The hot areas of the storage system may be tracked by maintaining a counter (heat map) of how often areas of the storage system are accessed.

In some embodiments, a score-based approach can be used to determine order by calculating a score for each remaining stripe unit. In a score-based approach, scores are assigned to each stripe unit with respect to ordering criteria. For example, a rebuild time score, a user performance score, and a data availability score are determined for each stripe unit in the RAID. In some embodiments, certain types of stripe units are de-prioritized for score calculation because it is less critical for those stripe units to be reconstructed right away. For example, scores are not calculated or are scheduled to be calculated later for certain types of stripe units such as those stripe that have been rebuilt on the spare device or strips that are never/rarely used.

Three example ordering criteria are discussed in the examples that follow: rebuild time, user performance, and data availability. As more fully described below, a policy for RAID rebuild can be determined by combining/weighting the ordering criteria. For example, a policy can be "shortest rebuild time first" (rebuild time is most heavily weighted), "best user performance first," (user performance is most heavily weighted), or "highest data availability first" (data availability is most heavily weighted). In various embodiments, weighting and combining the ordering criteria provides conflict resolution for ordering criteria that might conflict. Other ordering criteria are also possible, and a policy can be adjusted accordingly to accommodate other ordering criteria.

Rebuild time is an ordering criteria measuring the time it takes to rebuild all stripe units on the failed device. In various embodiments, one goal is to minimize the rebuild time, and a stripe is scored (assigned a rebuild time score) based on how long it takes to rebuild the stripe. In some embodiments, factors considered to determine the rebuild score include the locality of the data to be rebuilt (referred to as "rebuild locality" for simplicity) and the likelihood a rebuilt strip will be overwritten in the future (referred to as "likelihood of overwrite").

With respect to rebuild locality, rebuild time may be shorter if the stripe to be rebuilt is physically close to a stripe currently being rebuilt. For example, in HDDs, data is written to physical locations in the HDD using a head and arm. HDD head movement can be expensive, for example as measured by time and resources expended to move the HDD head to a desired location for a read/write. Stripe units that are logically next to each other are not necessarily physically next to each other. Rebuilding stripe units in logical sequential order can be expensive if logically adjacent stripe units are physically distant because the HDD head needs to move from one physical location to another (possibly far) physical location in order to rebuild stripe units in the logical sequential order. Suppose user applications are performing IOs while RAID is performing rebuild. Because user applications may access some stripes that are far away from the stripes that RAID rebuild is working on, RAID rebuild takes a long time to move the disk head back to the stripes under rebuild. Thus, rebuilding stripe units that are physically near a stripe unit that a disk head is currently accessing can reduce rebuild time. That is, it may be improve the performance or functioning of the devices performing rebuild to rebuild stripes that are adjacent to stripes that user applications are reading/writing, because the overhead of disk head movement is minimized.

With respect to likelihood of overwrite, the more frequently rebuilt stripes are overwritten during RAID rebuild, the longer the rebuild time. In some embodiments, a lower likelihood of overwrite causes a corresponding stripe unit to be prioritized for rebuild. A higher likelihood of overwrite causes a corresponding stripe unit to be de-prioritized for rebuild.

For the example of LFS atop RAID, a stripe is typically a segment. LFS links all the in-use segments into a singly-linked list, and links all the free segments into another singly-linked list. In various embodiments, normalized "likelihood of overwrite" scores are assigned to the segments in the in-use segment lists. LFS usually sorts in-use segments based on the amount of valid data in the segment. This sorting of the in-use segments is an indication of overwrite probability because the more valid data contained in the segment, the more likely that segment will be overwritten sometime in the future. In various embodiments, a low score is assigned to the segments in free-segment lists because the segments in the free-segment lists have a low probability of being overwritten.

For the example of other types of file systems atop RAID (not LFS), a stripe unit write counter ("write counter" for simplicity) is maintained to keep track of the number of writes per stripe unit. Normalized scores are assigned according to the number of writes per stripe unit as tracked by the write counter. For example, a stripe unit without writes is assigned a high score (e.g., 0.9999) while a stripe unit with the most writes is assigned a low score (e.g., 0.0000). The number of significant figures used for a score can be adjusted. More significant figures allow for greater differentiation in scores if there are more stripes (e.g., hundreds of thousands of stripes to score). The stripe unit with no writes is assigned a high score, which de-prioritizes that stripe unit for rebuild. The stripe unit with most writes is assigned a low score, which prioritizes that stripe unit for rebuild. Stripe units with a number of writes in between no writes and most writes are assigned a respective score on a scale between the lowest score and the highest score.

User performance score is an ordering criteria measuring responsiveness to user I/O requests. In various embodiments, a user performance score is determined based on, among other things, stripe unit reads. User performance may be affected by how often a stripe unit is read. If a stripe unit is read often, the responsiveness of that often-read stripe unit impacts user performance more than a stripe unit that is read less often. In various embodiments, a user performance score is determined by using a stripe unit read counter ("read counter" for simplicity) to keep track of the number of reads per stripe unit. Normalized scores are assigned according to the number of reads per stripe unit as tracked by the read counter. For example, a stripe unit without reads is assigned a low score (e.g., 0.0000) while a stripe unit with the most reads is assigned a high score (e.g., 0.9999). The stripe unit with most reads is assigned a high score, which prioritizes that stripe unit for rebuild. The stripe unit with no reads is assigned a low score, which de-prioritizes that stripe unit for rebuild. Stripe units with a number of reads in between no reads and most reads are assigned a respective score on a scale between the lowest score and the highest score.

Data availability score is an ordering criteria measuring the importance of the associated data being available. In various embodiments, a data availability score is determined based on, among other things, the importance and/or recoverability of a stripe unit.

With respect to importance, importance may be inferred by metrics (such as most recently accessed means more important data) or may be indicated by a user. For example, the user may specify a performance specification, e.g., data importance. Data importance may be based at least on part on the type of data such as belonging to a particular VM or database-related data, live data (more important) vs. snapshot data (less important), and filesystem data (more important) vs. file data (less important), and the like. In various embodiments, stripes are ordered by proportion of live data to dead data, and those stripes with higher live data proportion are rebuilt earlier than other stripes. The proportion of live data may indicate whether stripes will soon be dead. A dead (or soon-to-be-dead) stripe is de-prioritized for rebuilding.

The user may indicate the importance of data via a graphical user interface (GUI). In various embodiments, the importance of a stripe unit can be determined based on the information provided by the user as follows. The stripe units to which the important data (e.g., as indicated by the user or inferred from metrics) belongs are located and prioritized. Normalized scores can be assigned per stripe unit. For example, stripe units containing important data are assigned a high score such as 0.99 while other strips are assigned an average scores such as 0.50.

In some embodiments, data importance information is unavailable (e.g., the user did not provide any information). If data importance information is not available, file system semantics can be assessed and file system metadata blocks can be located. In various embodiments, a normalized score is assigned accordingly. For example, stripe units containing file system metadata are assigned a high score such as 0.99 while other stripe units are assigned an average score such as 0.50.

With respect to recoverability, the recoverability of a stripe unit is a measure of how easily data associated with the stripe unit is recovered. Stripe unit data may, in some cases, be recovered from different means. If there is more than one way to recover data, then that data is more recoverable than data that can only be recovered by a single means.

In various embodiments, recoverability is determined based on, among other things, whether stripe unit data is stored in read cache or write cache. If stripe unit data is cached in read cache and/or write cache, its data availability score is lowered because the data can be recovered from read/write cache. In other words, even if the stripe unit cannot be regenerated with surviving disks, the stripe unit data can be recovered from another means, here read/write cache.

Figure 6:
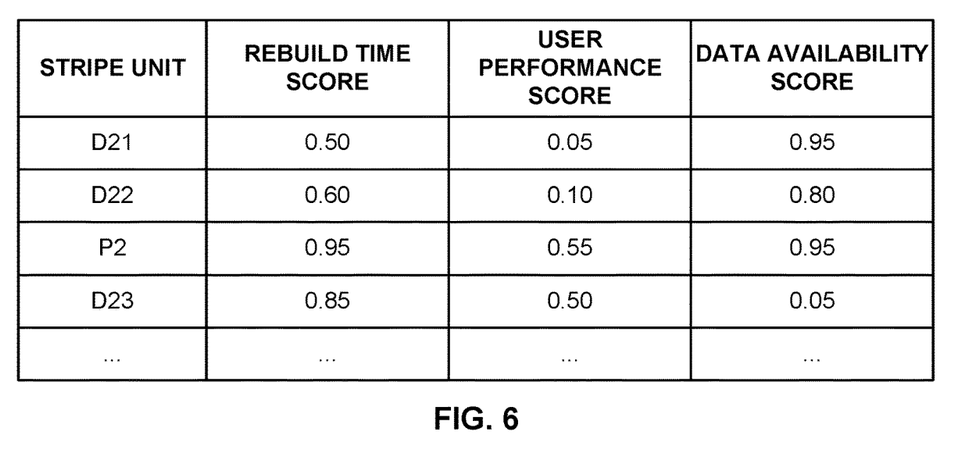
FIG. 6 is a block diagram of a table of example scores calculated for stripe units.

An example of rebuild score assignment will now be discussed using FIG. 6. FIG. 6 is a block diagram of a table of example scores calculated for stripe units. Stripe units are each assigned a score representing its priority for rebuild. The stripe unit scores of the remaining stripe units can be periodically evaluated to preferentially rebuild the stripe units with the highest (or lowest) scores. In this example, the highest scores are assigned to stripe units to be reconstructed first. Equation 1 below shows one example technique by which to calculate a weighted stripe unit score that is to be determined for a stripe unit, where $\alpha$ is a weight:

$$\text{Stripe Unit Score} = \alpha_1 * \text{rebuild\_time} + \alpha_2 * \text{user\_performance} + \alpha_3 * \text{data availability} \quad (1)$$

As shown in FIG. 6 for each stripe unit on the failed disk, each of rebuild time score, user performance score, and data availability score is calculated. Here, the range of a score is [0.00, 1.00). In various embodiments, the weighted stripe unit score is the weighted sum of the rebuild time score, the user performance score, and the data availability score.

Weighing and scoring may be employed to combine different policies and making global priority-based decisions. For example, if a user only cares about rebuild time, the user can set both $\alpha_2$ and $\alpha_3$ to 0.0, and set cu to 1.0. By doing so, the stripe unit scores of user performance and data availability will be zeroed, and only the stripe unit score of rebuild time will affect the weighted strip score. As another example, if the user thinks the three policies are equally important, the user can set each of the three weights to 1.0. Weights of each policy (rebuild time, user performance, data availability) can be predefined by users, and can be adjusted during a RAID rebuild. If weights are not specified by a user, a default value of weights may be set, e.g., 1.0. The sequence of stripe unit reconstruction can be carried out in an order determined by the rebuild time scores of the stripe units.

Returning to FIG. 5, a stripe unit is reconstructed based on the determined reconstruction order (504). In various embodiments, the stripe unit with the highest weighted score is selected for reconstruction and reconstructed for example by performing XOR computations. In various embodiments, the failed device is rebuilt by, among other things, reconstructing stripe units in the determined order using the spare device to overwrite stripe units as needed.

Process 500 determines whether there are any additional stripe units to reconstruct (506). If no additional stripe units to reconstruct remain, the process terminates. If there are additional stripe units to reconstruct, the process returns to 502 in which a reconstruction order is determined. In some cases, a reconstruction order may change over time including during reconstruction. Thus, recalculating a reconstruction order allows reconstruction to be dynamically adapted to improve the performance of the storage system.

An example of reconstructing stripe units based on rebuild scores will now be discussed using FIG. 7. FIG. 7 is a diagram of an example RAID group including a drive rebuilt using policy-driven RAID rebuild. The RAID group shown in FIG. 7 has the same characteristics as the one in FIG. 2 unless otherwise described herein.

The RAID group includes a spare device that has been populated by reconstructed data according to a "rebuild time first" policy. Referring to FIG. 7, this means that rebuild time score receives a weight of 1.0 while the other scores receive a weight of 0.0. Thus, the stripe unit with the highest rebuild time score (P2, which has a score of 0.95) is rebuilt first as shown. By contrast to conventional RAID rebuild, the stripe units are not reconstructed in sequential order (i.e., sequential order is D21, D22, P2, then D23). Instead, the stripe units are reconstructed to optimize rebuild time, and, consequently, improve the functioning of the storage system and applications supported by the storage system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
   an interface to a group of devices each having stripe units, wherein at least one of the devices is a spare device available to be used in the event of a failure of a device in the group of devices, the group of devices services a Log-structured File System (LFS), and an ordering criteria includes a quantity of valid data and probability of overwrite of in-use segments; and
   a processor coupled to the interface, the processor configured to:
      determine, based at least in part on the ordering criteria, an order in which to reconstruct stripe units to rebuild a failed device in the group of devices; and
      rebuild the failed device including by reconstructing stripe units in the determined order using the spare device to overwrite stripe units as needed.

2. The system of claim 1, wherein the group of devices comprise a redundant array of independent disks (RAID) group.

3. The system of claim 1, wherein the group of devices stores data according to one of RAID 5 protocol and RAID 6 protocol.

4. The system of claim 1, wherein the ordering criteria includes workload dynamics in the group of devices.

5. The system of claim 1, wherein the order criteria includes a performance specification indicated by a user.

6. The system of claim 1, wherein the order criteria includes a weighted combination of a plurality of policies.

7. The system of claim 6, wherein the weighted combination of a plurality of policies is updated dynamically.

8. The system of claim 6, wherein the plurality of policies includes at least one of: rebuild time, user performance, and data availability.

9. The system of claim 1, wherein the ordering criteria includes a frequency of access of data associated with a location in the group of devices.

10. The system of claim 1, wherein the ordering criteria includes a frequency of access of a stripe unit.

11. The system of claim 1, wherein the determination of an order includes scoring stripe units with respect to the ordering criteria.

12. The system of claim 11, wherein the scoring includes combining at least one of a rebuild time score, a user performance score, and a data availability score.

13. The system of claim 1, wherein the determined order is based at least in part on a weighted combination of scores.

14. A system comprising:
   an interface to a group of devices each having stripe units, wherein at least one of the devices is a spare device available to be used in the event of a failure of a device in the group of devices;
   a processor coupled to the interface, the processor configured to:
      determine, based at least in part on an ordering criteria, an order in which to reconstruct stripe units to rebuild a failed device in the group of devices; and
      rebuild the failed device including by reconstructing stripe units in the determined order using the spare device to overwrite stripe units as needed; and
   a cache adapted to store at least one of: reads and writes, and the ordering criteria includes importance of data and recoverability of data based at least in part on content of the cache.

15. The system of claim 14, wherein the importance of data is based at least in part on filesystem metadata.

16. The system of claim 14, wherein the importance of data is based at least in part on a type of data.

17. A system comprising:
   an interface to a group of devices each having stripe units, wherein at least one of the devices is a spare device available to be used in the event of a failure of a device in the group of devices; and
   a processor coupled to the interface, the processor configured to:
      determine, based at least in part on an ordering criteria, an order in which to reconstruct stripe units to rebuild a failed device in the group of devices; and
      rebuild the failed device including by reconstructing stripe units in the determined order using the spare device to overwrite stripe units as needed, wherein a rebuild locality score is based at least in part on likelihood of overwriting a stripe unit as indicated by a ranking of an in-use segment in a LFS in-use segment list.

18. The system of claim 17, wherein the rebuild locality score corresponds to a locality of data to be rebuilt and indicates how long it takes to rebuild a stripe unit at the corresponding locality.

19. The system of claim 17, wherein the rebuild locality score prioritizes those stripe units closer to a stripe currently being rebuilt over those strip units farther away from a stripe currently being rebuilt.

20. The system of claim 17, wherein the rebuild locality score prioritizes those stripe units with a lower likelihood of overwriting for rebuilding earlier over those strip units with a higher likelihood of overwriting.

21. A method comprising:
   determining, based at least in part on an ordering criteria including a quantity of valid data and probability of overwrite of in-use segments, an order in which to reconstruct stripe units to rebuild a failed device in a group of devices, wherein the group of devices each has stripe units, at least one of the devices is a spare device available to be used in the event of a failure of a device in the group of devices, and the group of devices services a Log-structured File System (LFS); and
   rebuilding the failed device including by reconstructing stripe units in the determined order using the spare device to overwrite stripe units as needed.

22. A computer program product embodied in a non-transitory computer readable storage medium and comprising computer instructions for:
   determining, based at least in part on an ordering criteria including a quantity of valid data and probability of overwrite of in-use segments, an order in which to reconstruct stripe units to rebuild a failed device in a group of devices, wherein the group of devices each has stripe units, at least one of the devices in the group of devices is a spare device available to be used in the event of a failure of a device in the group of devices, and the group of devices services a Log-structured File System (LFS); and
   rebuilding the failed device including by reconstructing stripe units in the determined order using the spare device to overwrite stripe units as needed.

\* \* \* \* \*

UNITED STATES PATENT AND TRADEMARK OFFICE
CERTIFICATE OF CORRECTION

PATENT NO. : 10,642,690 B1
APPLICATION NO. : 15/848330
DATED : May 5, 2020
INVENTOR(S) : Lei Tian, Shobhit Dayal and Amit Gud Page 1 of 1

It is certified that error appears in the above-identified patent and that said Letters Patent is hereby corrected as shown below:

In the Specification

In Column 10, Line 14, delete "scores" and insert --score--, therefor.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*